Figure 1:
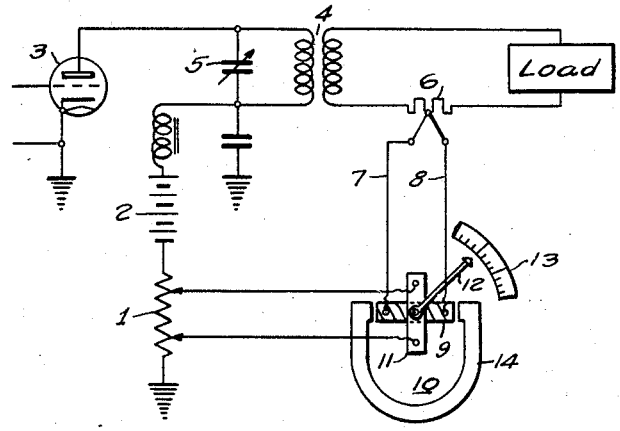

Jan. 13, 1948.   J. R. BOYKIN   2,434,544
EFFICIENCY METER
Filed March 25, 1944

WITNESSES:

INVENTOR
John R. Boykin.
BY
F. W. Lyle
ATTORNEY

Patented Jan. 13, 1948

2,434,544

UNITED STATES PATENT OFFICE 2,434,544

EFFICIENCY METER

John R. Boykin, Baltimore, Md., assignor to Westinghouse Electric Corporation, East Pittsburgh, Pa., a corporation of Pennsylvania Application March 25, 1944, Serial No. 528,124

5 Claims. (Cl. 171—95)

My invention relates to electrical measuring instruments and, in particular, relates to an instrument for indicating the efficiency of transformation from direct current to alternating current in a converter. A radio frequency amplifier or oscillator is one example. To take a specific instance the amount of direct current power which an amplifier draws with a given radio frequency load depends upon the adjustment of the tunable elements in its circuit. By adjusting these a point is found where the direct current power input is a minimum for a given radio-frequency load. In thus tuning the amplifier, it is desirable to have an immediate indication of the ratio of the radio frequency output power to the direct current input of the amplifier. However, readings of an input wattmeter and an output wattmeter are unsatisfactory as a means of attaining this end, since it is necessary to perform calculations in order to determine the efficiency, and the time required for doing this is often such that changes of conditions in the circuit take place during the transfer of reading of the indicating instruments and making this calculation.

One object of my invention is, accordingly, to produce an instrument capable of indicating at all desired times the efficiency of transfer of power from the input to the output circuit of an electrical converter.

Another object of my invention is to provide an instrument which will give instantaneous and immediate readings of the efficiency of transfer of power between the direct current supply circuit and the output circuit of an electronic amplifier.

Figure 2:
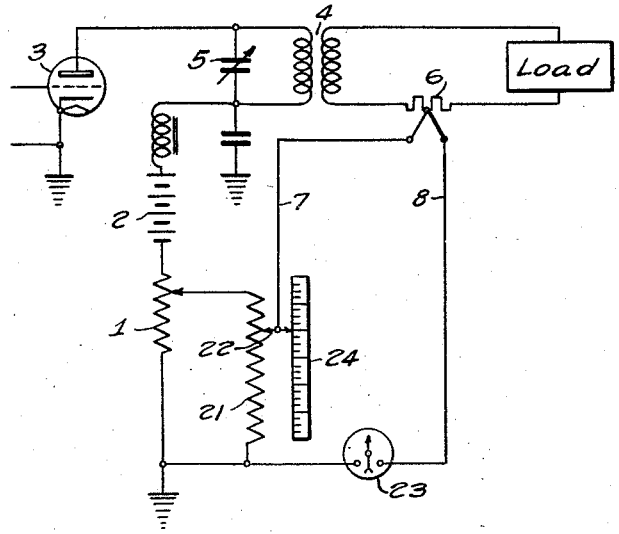

Other objects of my invention will become apparent upon reading the following description, taken in connection with the drawing, in which:

Figure 1 is a schematic diagram of an electrical circuit embodying the principles of my invention; and Fig. 2 is a schematic drawing of an alternative circuit embodying the principles of my invention.

Referring in detail to the drawing, the resistor 1 is connected in series with the direct current supply 2 of a radio frequency amplifier which is here exemplified by a single electron tube 3 in a manner familiar to engineers skilled in the radio art. The radio frequency output circuit of the amplifier 3 is connected through a transformer 4 having its primary shunted by a variable capacitor 5 with the heater element of a thermocouple 6 having a pair of direct current output terminals 7, 8 for its thermoelectrically generated current. The terminals 7, 8 are connected to a coil 9 which forms one winding of an efficiency-indicating instrument 10. The coil 9 and a second similar coil 11 are supported, preferably at right angles to each other, to turn on a pivot in the instrument 10 to which pivot is connected a needle 12 which traverses an indicating scale 13. The terminals of the coil 11 are, in turn, connected to a pair of tap points on the resistor 1. The coils 9 and 11 are positioned in the field of a permanent magnet 14.

In tuning such an amplifier, as has just been described, the load impedance connected to the output of the transformer 4 is usually a constant quantity during the time that the tuning adjustment is being carried out. Such being the case, it will be evident that the power output to the load from the amplifier 3 will be proportional to the square of the current traversing the heater of the thermocouple 6. The output of thermoelectrical current from the terminals 7 and 8 is, likewise, proportional to the square of the current traversing the heater element of thermocouple 6, and so is proportional to the load on the output of the amplifier 3. The magnetic field set up by the flow of this thermoelectrical current through the coil 9 in meter 10 is, therefore, proportional in strength to the power output of the amplifier 5.

Similarly, during the time in which the amplifier is undergoing tuning, the voltage impressed on the plate circuit of the tube 2 will remain substantially constant and, as a result of this, it will be evident that the current through the resistor 1 is proportional to the power being supplied by the source 2 to the amplifier 3. Since the current in the winding 11 of meter 10 is proportional to the voltage drop through the resistor 1, it is proportional, in turn, to the current through resistor 1 and, hence, to the power being supplied to the amplifier 3. The magnetic field in meter 10, due to the winding 11, is accordingly proportional to the input power to the amplifier 2.

The magnetic fields, due to the windings 9 and 11 being at an angle to each other, will combine vectorially to produce a magnetic field which will have an angular position relative to the windings 9 and 11, dependent upon the relative magnitudes of the magnetic fields they respectively set up. This will be evident by noting that if the magnetic fields of the windings 9 and 11 are equal, they will produce a magnetic field having a direction which bisects the angle between these windings. Now, if the magnetic field, due to one of these windings, is decreased from this equal value, it will be evident that the resultant magnetic field will no longer bisect the field between the coils 9 and 11, but will assume some other position relative to them which is a function of the ratio of the respective strengths of the magnetic fields, due to windings 9 and 11. Since these magnetic fields are respectively proportional to the output power and the input power of the amplifier 3, it is evident that the position relative to these windings of the resultant magnetic field set up by the windings 9 and 11 is a unique function of the ratio of the radio frequency output power to the power supplied by source 2 to amplifier 3; that is to say, it is a function of the efficiency of power conversion in the amplifier 3.

Since the coils 9 and 11 are free to turn upon their pivoted support, they will take up a position in which their resultant magnetic field above-mentioned is in alignment with the poles of the magnet 14. Since, the angular position of the coils 11 and 9 relatively to their resultant magnetic field has already been shown to be a unique function of the efficiency of conversion of power in the amplifier 3, it follows that the angular position of these coils relative to the magnet 14 will be a unique function of that efficiency. Thus, the position of the pointer 12, which moves with coils 9 and 11, given on scale 13 a unique indication of the efficiency of power conversion. The scale 13 can obviously be calibrated by making wattmeter or other readings of the direct current input and radio-frequency output so that the needle 13 will indicate at any time the efficiency of power conversion in the amplifier 3.

Referring to the modification of my invention shown in Fig. 2, a resistor 1, which is connected to tube 3 just as is resistor 1 in Fig. 1, is shunted by a second resistor 21 having a movable tap 22. The tap 22 is connected through a current indicating instrument, such as a galvanometer 23, in series with the terminals 7, 8 of the thermoelectric output current from a thermocouple 6. The thermocouple 6 is connected in series with the output circuit of an amplifier, just as was the thermocouple 6 already described in Fig. 1. To obtain a reading of the efficiency of the amplifier, the movable tap 22 is moved up or down on the resistor 21 until the reading of the instrument 23 is zero. At that time, the efficiency of the amplifier is indicated by the ratio of the resistance between the tap 22 and the lower end of resistor 21 to the entire resistance of the resistor 21. A suitable pointer and scale 24 may be arranged beside the resistor 21 to indicate this ratio.

While I have described specific embodiments of the principles of my invention, these principles are of broader application in ways which will be evident to those skilled in the art.

I claim as my invention:

1. In combination with an electrical network having a direct current supply circuit and an output circuit, a resistor traversed by the current of said supply circuit, means having a direct current output from its output terminals which is proportional to the square of the current traversing it connected in said output circuit, an instrument comprising a pair of angularly displaced coils provided with a pivoted support; means for connecting one of said coils in shunt to said resistor; means for connecting the other of said coils to said output terminals; a direct current magnet producing a field transverse to the pivotal axis of said coils; and means for indicating the angular position assumed by said coils, relative to said magnet.

2. In combination with an alternating current amplifier, a resistor traversed by the input current to said amplifier; a thermocouple traversed by the output current of said amplifier; an indicating device comprising windings angularly displaced from each other and pivotally supported in the field of a direct current magnet; means for connecting one of said coils in shunt with said resistor; means for connecting the other of said coils to the direct current output terminals of said thermocouple; and means for indicating the relative position of said coils to said magnet.

3. In combination with an electrical network having an input and an output circuit, means for producing a current proportional to the power in said input circuit, means for producing a current proportional to the power in said output circuit, a pair of angularly displaced windings respectively connected to said means and a magnetic device having a tendency to align itself with the resultant magnetic field due to said windings pivotally mounted relative to said windings.

4. In combination with an electrical network having an input and an output circuit, means for producing a current proportional to the power in said input circuit, means for producing a current proportional to the power in said output circuit, a pair of angularly displaced windings respectively connected to said means and a magnetic device having a tendency to align itself with the resultant magnetic field due to said windings pivotally mounted relative to said windings, and means to indicate the relative angular positions of said windings and said mangetic device about said pivotal mounting.

5. In combination with an electrical network to which power is supplied by direct current from a source of substantially constant voltage and having an output circuit having a substantially constant impedance, means having a direct current output which is substantially proportional to the square of the current in said output circuit, an auxiliary device which responds to changes in the ratio of said direct current to the square of the current in said output circuit.

JOHN R. BOYKIN.

REFERENCES CITED

The following references are of record in the file of this patent:

UNITED STATES PATENTS

| Number | Name | Date |
| --- | --- | --- |
| 1,827,333 | Richardson | Oct. 13, 1931 |
| 1,957,454 | Gebhard | May 8, 1934 |
| 1,906,597 | Hoard | May 2, 1933 |
| 1,920,646 | Kroger | Aug. 1, 1933 |
| 1,969,341 | Wallace | Aug. 7, 1934 |
| 2,137,787 | Snow | Nov. 22, 1938 |